R. P. JACKSON.
VOLTAGE REGULATOR.
APPLICATION FILED MAR. 9, 1908.

1,017,670.

Patented Feb. 20, 1912.

2 SHEETS—SHEET 1.

WITNESSES:
C. L. Belcher
Otto J. Schairer

INVENTOR
Ray P. Jackson
BY Wesley G. Carr
ATTORNEY

R. P. JACKSON.
VOLTAGE REGULATOR.
APPLICATION FILED MAR. 9, 1908.

1,017,670.

Patented Feb. 20, 1912.
2 SHEETS—SHEET 2.

UNITED STATES PATENT OFFICE.

RAY P. JACKSON, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

VOLTAGE-REGULATOR.

1,017,670.      Specification of Letters Patent.     Patented Feb. 20, 1912.

Application filed March 9, 1908. Serial No. 420,065.

*To all whom it may concern:*

Be it known that I, RAY P. JACKSON, a citizen of the United States, and a resident of Wilkinsburg, in the county of Allegheny and State of Pennsylvania, have invented a new and useful Improvement in Voltage-Regulators, of which the following is a specification.

My invention relates to voltage regulators for use in connection with generators that supply electrical circuits, and it has for its object to provide a regulator that shall be effective in operation and simple and economical in construction, and in which no movable contacts or other members shall be employed.

My invention consists in employing a current-rectifying device to transform the alternating current of the distributing circuit into direct current to be supplied to a circuit including either the field magnet winding of the main generator or that of an exciter for the main generator. A suitable ohmic resistance is connected between the direct current terminals of the rectifying device and also in series with the field magnet winding upon which the regulation is directly effected. The rectifying device being connected across the distributing circuit, a direct current voltage is applied to the resistance which is substantially proportional to the voltage of the alternating current circuit, and, since the field magnet winding is either shunt or separately excited, the drop of potential over the field magnet winding is caused to vary substantially inversely as the voltage of the distributing circuit. Thus, when the voltage of the distributing circuit decreases, the current traversing the field magnet winding increases, thereby serving to increase the voltage of the generator, while, when the voltage of the circuit increases, the field strength is caused to decrease with a corresponding diminution of the generator voltage.

Figure 1:
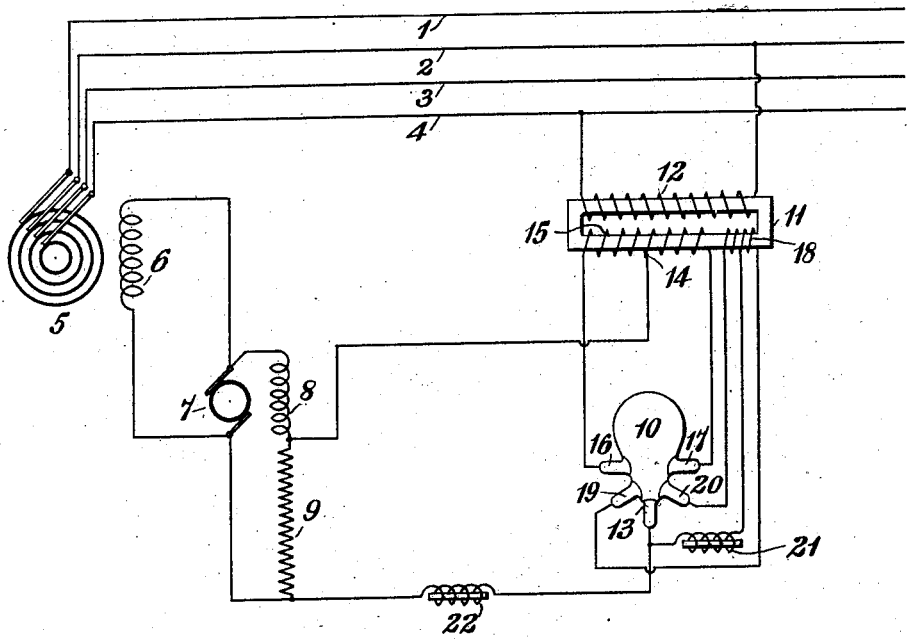
Figure 2:
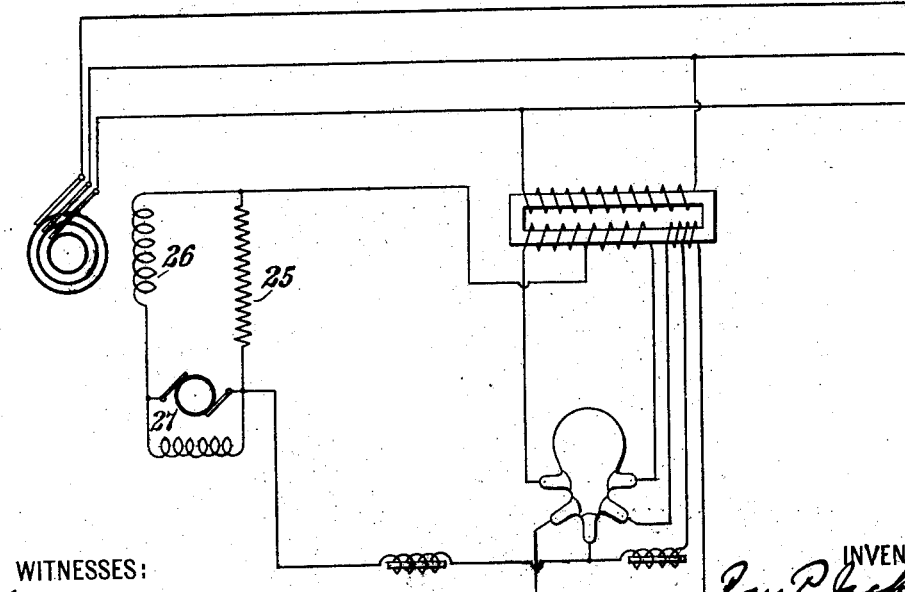
Figure 3:
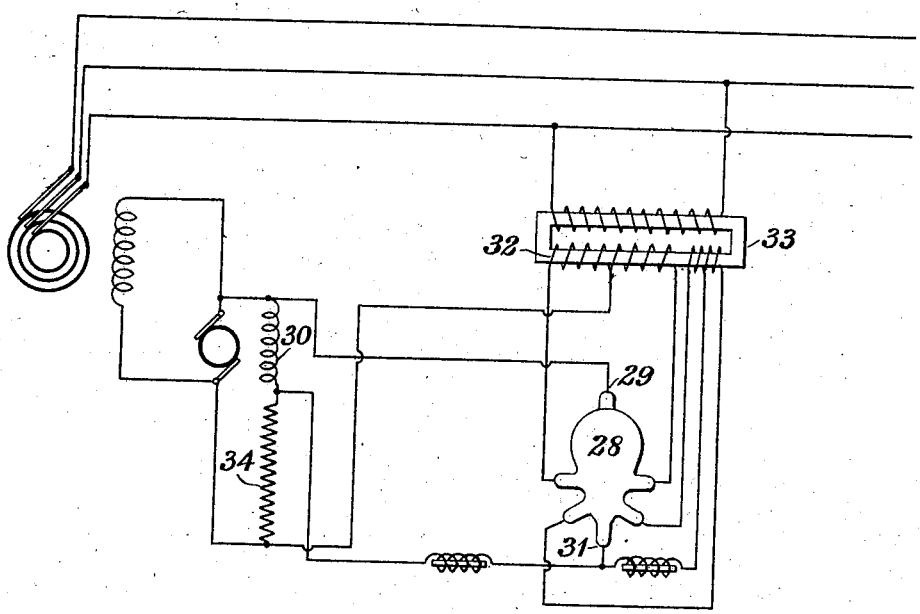

Figure 1 of the accompanying drawings is a diagrammatic view of a system embodying my invention, and Figs. 2 and 3 are similar views of modifications of the system of Fig. 1.

In Fig. 1, a two-phase distributing circuit comprising conductors 1, 2, 3 and 4 is supplied from a generator 5 having a field magnet winding 6 that is supplied from an exciting generator 7, field magnet winding 8 of which is here shown as shunt excited in the usual manner, though, of course, it may be otherwise excited, if desired. In series with the exciter field magnet winding 8 is an ohmic resistance 9 upon which a direct current voltage that is proportional to the alternating voltage of the distributing circuit is impressed by means of a current-rectifying apparatus comprising a rectifying device 10 and a transformer 11, the primary winding 12 of which is connected between circuit conductors 2 and 4. The rectifying device 10 is here indicated as of the vapor type, though any other suitable device may be employed instead, provided the drop of potential through the rectifier, or the ratio of the alternating to the direct current voltage, is substantially constant for all current values within the range of operation. The positive or direct current terminal 13 of the rectifying device 10 is connected to one terminal of the resistance 9, and the other terminal of the resistance is connected to a neutral or other suitable intermediate point 14 of the secondary winding 15 of the transformer 11, the extremities of the winding 15 being connected, respectively, to alternating current terminals 16 and 17 of the rectifying device. The transformer 11 is provided with an auxiliary secondary winding 18, the extremities of which are connected to auxiliary alternating current terminals 19 and 20 of the rectifying device 10, and the neutral or some other suitable intermediate point of which is connected to the positive or direct current terminal of the rectifying device, an impedance device 21 being included in the latter connection for the purpose of sustaining the rectified current and of affording the desired regulation. The transformer winding 18 and the auxiliary terminals 19 and 20 of the rectifying device are employed for the purpose of maintaining the rectifying device in active operation, regardless of whether or not current traverses the device by way of the main terminals. An impedance device 22 is included in the connection between the positive terminal 13 of the rectifying device and the resistance 9 for the purpose of sustaining the rectified current and of affording suitable regulation.

Under normal operating conditions, the voltage applied to the resistance 9 by the rectifying device will be in the same direction as that applied thereto by the exciter armature and will just equal the drop of potential over the resistance which is caused by the normal flow of current from the exciter armature. If, however, the voltage of the circuit 1—2—3—4 decreases, the voltage applied across the terminals of the resistance 9 by the rectifying device will be correspondingly diminished, while the drop of potential over the field magnet winding 8 will be correspondingly increased. The conditions just stated will be better understood by assuming that the resistances of the field magnet winding 8 and of the device 9 are each 5 ohms, and that, under normal conditions, the voltage of the exciter is 100. Then the drop of potential over the field magnet winding, as well as that over the resistance 9, is 50 volts and the rectifying device should apply 50 volts to the terminals of the resistance device. If the voltage of the circuit 1—2—3—4 decreases to such an extent that the voltage applied by the rectifying device to the resistance 9 is reduced to 45, the drop of potential over the field magnet winding becomes 55 volts, with the result that 11 amperes of current are caused to traverse the field magnet winding, whereas, under normal conditions, only 10 amperes traverse the said winding. The field strength of the exciter is correspondingly increased, and in like manner, also, the field strength and voltage of the main generator. If the voltage of the distributing circuit increases to such an extent that the rectifying device is caused to apply 55 volts to the resistance 9, a drop of potential of 45 volts will occur over the field magnet winding, with the result that only 9 amperes of current will traverse the said winding. The voltage of the exciter, and also the field strength and voltage of the main generator will, therefore, be correspondingly reduced. Under other conditions than those specifically described, the operation of the regulator will be readily understood from the foregoing description.

While, in most cases, it will be found preferable to adjust the field strength of the main generator indirectly by adjusting the field strength of the exciter, it may be found desirable, in some cases, to effect the regulation directly upon the main generator, as illustrated in Fig. 2, in which a resistance 25 is connected in series with field magnet winding 26 of the main generator; the resistance 25 and the field magnet winding 26 being included in the armature circuit of a direct current exciter 27. As illustrated in Fig. 1, the resistance device 25 is connected between the direct current terminals of the rectifying apparatus, and the operation of the system is substantially as described in connection with Fig. 1.

In order that the regulator may act promptly in restoring normal voltage conditions, and in order to prevent undue oscillations in the generator voltage during the regulating action, it may be found desirable to arrange the apparatus as illustrated in Fig. 3, in which a rectifying device 28 is provided with an auxiliary terminal 29 that is connected to one extremity of field magnet winding 30 of the exciter, the other extremity of the field magnet winding being connected to the positive or direct current terminal 31 of the rectifying device. The neutral or some other suitable intermediate point of the secondary winding 32 of a transformer 33 is connected to one extremity of a resistance 34 that is included in series circuit with the exciter field magnet winding 30.

In general, the operation of the system is similar to that of Fig. 1, except that when the drop of potential over the field magnet winding 30 reaches a predetermined value, an arc occurs between terminals 29 and 31 of the rectifying device 28, the greater portion of the current being thereby diverted from the field magnet winding 30. Upon establishment of the arc, a considerable reduction in the voltage between the terminals 29 and 31 of the rectifying device occurs, the voltage ultimately becoming insufficient to maintain the arc, whereupon the field strength of the exciter will be again increased. Thus, the field strength of the exciter is prevented from continuing to increase to such a value as to cause the voltage of the main generator to increase beyond its normal value, as might otherwise be the case.

By the proper adjustment of the apparatus, oscillations of the main generator voltage from its normal value, in effecting the desired regulation, may be greatly restricted, since the reduction of the exciter field strength, caused by the arc between rectifier terminals 29 and 31, will occur before such reduction could be caused by an increase of the voltage of the distributing circuit, on account of the delays introduced by the inductances of the main generator and of the transformer 33. The voltage applied to the exciter field magnet winding will oscillate in value considerably, but because of the inductances in the exciter and main generator circuits these oscillations will be materially damped and the main generator voltage will be affected by substantially the average of the said oscillations.

I claim as my invention:

1. The combination with an electrical circuit, and a generator associated therewith, of means for governing the voltage of the generator comprising a field magnet winding, a resistance in series therewith, and a current-rectifying device having its direct current terminals respectively connected to the terminals of the resistance and adapted to cause the drop of potential over the resistance to vary approximately as the voltage of the circuit.

2. The combination with an electrical circuit, and a generator associated therewith, of means for governing the voltage of the generator comprising a field magnet winding, a resistance in series therewith, and a current-rectifying device adapted to cause the drop of potential over the resistance to vary approximately as the voltage of the circuit, and having auxiliary terminals connected respectively to points of the field magnet winding.

3. The combination with an electrical circuit, and a generator associated therewith, of means for governing the voltage of the generator comprising a field magnet winding, a resistance in series therewith, means for causing the drop of potential over the resistance to vary approximately as the voltage of the circuit, and means for causing a reduction in the drop of potential over the field magnet winding when the said drop attains a predetermined value.

4. The combination with an electrical circuit, and a generator associated therewith, of a currrent-rectifying device upon which is impressed a voltage that is proportional to the voltage of said circuit, an exciter for the generator having a field magnet winding, and a resistance connected in series with the exciter field magnet winding and between the direct current terminals of the rectifying device.

5. The combination with an electrical circuit and a generator associated therewith, of means for governing the voltage of the generator comprising a field magnet winding, a resistance in series therewith, and a current-rectifying device upon which a voltage is impressed that is in proportion to the voltage of the said circuit and the direct current terminals of which are respectively connected to the terminals of the resistance.

6. The combination with an electrical circuit and a generator associated therewith, of means for governing the voltage of the generator comprising a field magnet winding, a resistance in series therewith, and means for causing the drop of potential over the resistance to vary approximately as the voltage of the circuit.

In testimony whereof, I have hereunto subscribed my name this 27th day of Feb., 1908.

RAY P. JACKSON.

Witnesses:
R. B. INGRAM,
BIRNEY HINES.

---

Copies of this patent may be obtained for five cents each, by addressing the "Commissioner of Patents, Washington, D. C."